United States Patent [19]

Craig et al.

[11] 3,762,931

[45] Oct. 2, 1973

[54] MACARONI PROCESS

[75] Inventors: Theodore W. Craig, Lafayette; Richard G. Henika, Alamo; William H. Hoyer, San Francisco, all of Calif.

[73] Assignee: Patent Technology, Inc., San Francisco, Calif.

[22] Filed: Dec. 2, 1970

[21] Appl. No.: 94,292

[52] U.S. Cl. .................................................. 99/85
[51] Int. Cl. ............................................. A23l 1/16
[58] Field of Search ................................. 99/85, 57

[56] References Cited
UNITED STATES PATENTS

| | | | |
|---|---|---|---|
| 3,484,251 | 12/1969 | Lawrence et al. | 99/85 |
| 3,149,979 | 9/1964 | Bohn | 99/92 X |
| 3,053,666 | 9/1962 | Henika et al. | 99/90 R |

OTHER PUBLICATIONS

Hirai et al., "Properties of Wheat Starch Pastes Containing Components of Cheddar Cheese Whey" Food Technology, July 1970, pages 79–84.

Primary Examiner—Raymond N. Jones
Assistant Examiner—James Robert Hoffman
Attorney—Flehr, Hohbach, Test, Albritton & Herbert

[57] ABSTRACT

An improved process for making macaroni products (alimentary pastes including vermicelli, spaghetti, noodles, macaroni, etc.) involving the steps of mixing essential paste forming ingredients including semolina and water with one or more paste modifying agents from the group of whey solids and edible sulfhydryl reducing substances (cysteine, glutathione and sulfite salts). Mixing and extrusion of the paste to form desired macaroni products is more easily accomplished in the presence of the indicated paste modifying agents, and can be accomplished with substantially reduced amounts of process water. The extruded products are characterized by reduced moisture content, improved surface characteristics, and substantially decreased drying requirements (time and energy). The improved characteristics of the extruded products permit use, as is (in canning or wet packaging operations), or, alternatively, drying and packaging in substantially reduced periods of time.

16 Claims, 2 Drawing Figures

INVENTORS
THEODORE W. CRAIG
RICHARD G. HENIKA
WILLIAM H. HOYER

BY Flehr, Hohbach, Test,
Albritton & Herbert
ATTORNEYS

MACARONI PROCESS

BACKGROUND OF THE INVENTION

As used in this application, the term "macaroni" includes the entire group of alimentary pastes represented by the terms vermicelli, spaghetti, noodles, macaroni and like products. [1] 'See "Marcaroni Products" by Dr. Ch. Hummel, Food Trade Press, Ltd., 2nd Ed., 1966, page 1; also "Part 16 - Macaroni and Noodle Products, Definitions and Standards of Identity," Federal Food and Drug Administration, effective Dec. 15, 1955, 20 F.R. 9575 and 28 F.R. 14312." Processes for the commercial manufacture of macaroni products are well known and generally involve mixing the purified middlings of durum or other hard wheat (i.e., semolina) with water to form a paste, following which the paste is extruded and cut to form the units of desired shape and length. Because it is so highly glutinous that pastes made from it will support their own weight, durum wheat is the most widely used in the making of macaroni products. The thick viscous paste or dough prepared from durum wheat is forced, under great pressure, through holes in metal dies which have the desired cross-section. In the manufacture of hollow products such as spaghetti and macaroni, metal pins may project into the holes in the die, causing the dough which is forced through to emerge as a plurality of hollow tubes. As they emerge, the extruded tubes or strings are cut into desired lengths and, most commonly, dried. In general, only a semolina which is high in gluten producing proteins, such as the flour obtained from durum wheat, will have the necessary properties for making macaroni products. Wheats other than durum tend to produce products which break apart from their own weight. However, durum wheat may be blended with other hard wheats, or even farina, provided the proportion of durum is sufficient to provide the desired characteristics.

To produce a satisfactory dough or paste for macaroni processing, the semolina and water must be mixed in certain prescribed proportions. For example, 100 parts by weight of semolina having a water content of 13 to 15 percent may be mixed with 20 to 30 parts by weight of water to give a very satisfactory dough for spaghetti or macaroni products. The exact proportion of the added water depends, to some extent, upon the particular macaroni product to be produced, the quality of the semolina and the available manufacturing equipment (e.g., batch or continuous). It is important, however, that the proportion of semolina and water be carefully measured and strictly constant. According to present practice, an emulsifier is also added to the mix (e.g., a concentrated glyceryl monostearate), to reduce the stickiness or tendency toward clumping of the freshly prepared units. The process water must therefore be heated to a relatively high temperature (e.g., 180° F.) to obtain effective dispersion of the emulsifier.

Kneading or mixing of the ingredients to form a paste or dough is accomplished fairly rapidly (e.g., 3–10 minutes), following which the dough is extruded at high pressure through the extrusion die. The pressures required to extrude macaroni products through the average die range from 3,500 to 7,000 pounds per square inch, with the result that relatively large, substantially built and expensive machines are required to effectively carry out the processing. To illustrate, a spaghetti dough of 30 percent moisture content and at a temperature of 130° F. will require an extrusion pressure of 4,000 to 4,500 pounds per square inch. The resulting extruded dough is subjected to preliminary drying, for a period of two to three hours, to reduce the moisture content to about 20 to 24 percent by weight of the extruded product. Most conventional processes thereafter dry the macaroni products in a final drying step which may range from 18 to 30 hours, again depending upon the type of product and the equipment used. Thus, commercial continuous dryers for spaghetti and macaroni require approximately 24 hours for the final drying step, whereas large batch dryers will effect drying, with proper control, in 30 to 36 hours. During this final drying step, the moisture content is reduced to about 12 to 14 percent on the weight of the product.

The drying steps (preliminary and final) undoubtedly are the most difficult and delicate operations involved in the successful manufacture of macaroni products. The drying of the macaroni does more than merely reduce the moisture content; it also develops the final color, surface characteristics and texture of the product. It is essential, therefore, that the drying conditions be controlled to prevent surface checking and cracking during the drying cycle, and to insure that uniform drying occurs from the interior to the exterior of the products. Products which warp or crack during the drying, or which crack after packaging for sale, will not be acceptable in the commercial market. In like fashion, products which will not withstand variable cooking conditions, without loosing their shape or becoming pasty or watery, will have limited commercial value. Sloughing of fragments of material from the surface of the macaroni products is a particular problem in the manufacture of canned goods such as canned spaghetti. Thus, products with extensive surface cracks or checks tend to introduce fragments of the extruded dough into the liquid portion of the prepared food, causing the resultant product to cloud and thicken in an unsatisfactory manner. To solve this problem, the commercial processor has found it necessary to pre-dry and blanch (i.e., steam treat) the product to flush away the rough end surfaces and thereby insure that the product can be successfully mixed with sauces and canned. Present requirements of pre-drying, drying and/or blanching the products, therefore impose very strict limitations on the drying or throughput rates, as well as the temperature and heat input to the dryers, which, to date, have decreased the flexibility of the commercial operations.

From the foregoing, it will be apparent that an improved macaroni process, as respects the limitations on mixing and extruding, and particularly the time and control requirements with respect to drying, is greatly to be desired.

SUMMARY OF THE INVENTION AND OBJECTS

This invention relates to processes (batch and continuous) for the manufacture of commercial macaroni products such as vermicelli, spaghetti, noodles, macaroni, various prepared or specialty products and like alimentary pastes. It particularly relates to improvements in the mixing, extrusion and drying steps involved in conventional macaroni processing.

In general, it is an object of the present invention to provide a new macaroni process in which optimum paste and product characteristics are developed in a novel manner.

Another object of the invention is to provide a novel process of the above character which affords a paste or dough which more easily extrudible to provide extruded products of improved characteristics.

Another object of the invention is to provide a process of the above character which provides an extruded dough or paste of greatly reduced moisture content, thus providing substantially improved (i.e., decreased) drying requirements.

Another object of the present invention is to provide a process of the above character which is extremely simple with respect to the number of operations required, and which effects economies by reducing the overall time, equipment and space required for the complete process, and by providing good flexibility.

A further object of the invention is to provide an improved process of the above character which is readily adapted to existing equipment and procedures, thereby facilitating the improved production of a wide variety of high quality macaroni products and like alimentary pastes.

Another object of the invention is to provide macaroni products and alimentary pastes of the character described which, as carried out in accordance with the present process, are of improved high quality.

As a general statement, the present invention is predicated on our discovery that certain paste modifying agents can be introduced into conventional macaroni and alimentary paste mixes to develop improved mixing and extrusion characteristics in the presence of substantially reduced proportions of process water, ranging from 60 to no more than 90 per cent of the normal requirements. With respect to conventional macaroni processes, the proportion of added water required for effective mixing and extrusion of the paste or dough is reduced by approximately one fourth to one third the amount normally required, whereas the mixing and extrusion qualities of the paste are far superior, the quality of the extruded product improved and the drying period greatly reduced, with concomitant savings in time and drying facilities. As hereinafter described in detail, the paste modifying agents of the present invention are selected from the group of whey solids and edible sulfhydryl reducing substances, which are capable of functioning independently to achieve the desired results, and also, of cooperating with one another to provide a cumulative or synergistic effect which provides greatly enhanced processing and product characteristics.

Other objects and features of the invention will appear from the following description in which the preferred embodiments have been set forth in conjunction with the accompanying drawings.

GENERAL STATEMENT OF THE INVENTION

In accordance with the present invention, the special paste modifying agents as herein disclosed are introduced to the mixer of a macaroni processing line (batch or continuous) either separately, with the dry ingredients, or along with the process water. For example, in a continuous processing line, the modifying agents are advantageously introduced in desired proportional amount to the process water and fed with the process water and semolina directly to the mixer. The modifying agents have been found to improve the mixing and extrusion characteristics of the macaroni paste or dough so that mixing and extrusion are accomplished with substantially reduced power requirements and, more importantly, with reduced requirements as to the amount of process water to effect the mixing and particularly the extrusion. In the mixed paste, the properties of the modifying agents (physical and chemical) unexpectedly provide optimum dough or paste properties at proportions of added water ranging from 60 to no more than 90 per cent of the amount required in the absence of the modifying agents, and additionally make possible improved product quality. Extrusion force or pressure to satisfactorily extrude the products is likewise greatly reduced, to as little as 50 percent of that normally required.

The paste modifying agents additionally impart improved characteristics in the drying stages of the process so that drying is accomplished in a period of the order of two-thirds to three-fourths of the drying time normally required. The dried products also exhibit improved characteristics associated with more uniform drying, including a substantial reduction or elimination of surface checks or cracks, a smoother extruded surface and a more uniform distribution of the retained moisture content.

DETAILED DESCRIPTION OF THE INVENTION

Figure 1:
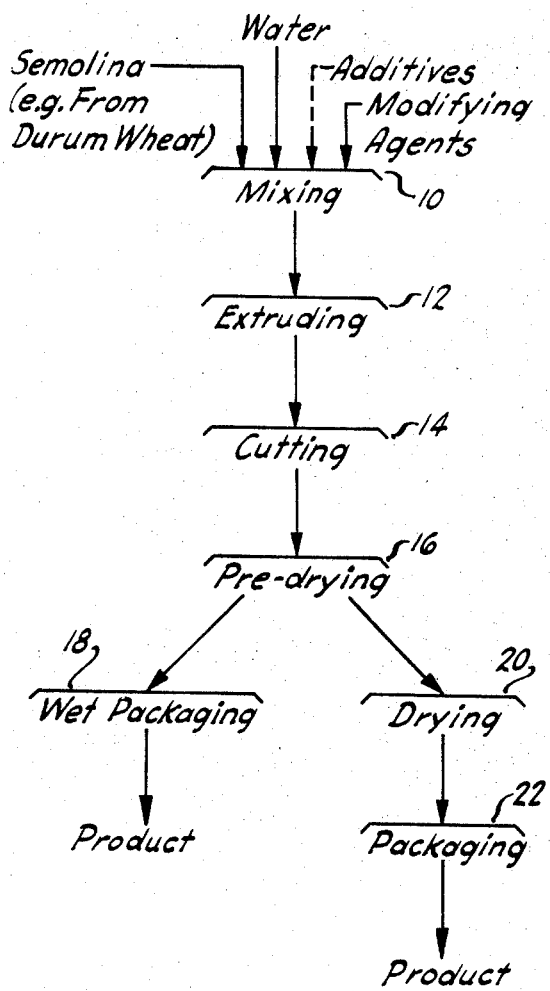
FIG. 1 is a flow sheet illustrating one procedure for carrying out the invention.

Referring to FIG. 1, essential ingredients for making a macaroni product are supplied to Step 10. Such ingredients include semolina, process water in reduced amounts, and additives as may be desired for particular products (e.g., egg, vegetable solids, seasonings, soya, wheat germ, supplemental vitamins and minerals, etc.). The paste modifying agents (whey solids and/or sulfhydryl reducing agents) are also added in Step 10. Depending on the particular plant operation, the mixing may be carried out as part of a batch or continuous process. In either event, we have found that incorporation of the paste modifying agents effects a substantial reduction in the required energy input to the mixer, ranging from 10 to 50 percent, or more. In expressing this decrease in energy input, the requirements for mechanical working can be appropriately expressed in terms of horse power per pound of paste or dough. However, as specifically related to the mechanical mixing employed in the plant, it is more conveniently expressed for a particular dough or paste in terms of the so-called Brabender Units (B.U.) obtained on the plant or laboratory farinograph (See specific examples herein). Regardless of how measured, the energy requirements for mixing are greatly reduced as indicated above. Good mixing to a proper paste or dough consistency in Step 10 is normally obtained in a very short time, of the order of 2 to 6 minutes.

As a result of the substantial reduction in the input of energy required to mix the paste (and also to extrude the paste, as hereinafter described), it is possible to substantially reduce the amount of water added to the mixing Step 10. In practical terms, we have found that the proportion of water required to effectively mix and extrude the paste can be reduced as much as 30 to 40 percent with the result that the total process water may be no more than 60 percent of the normal requirements for processing similar products. To illustrate, in conjunction with a typical spaghetti process, 3,000 pounds of durum semolina can be very satisfactorily processed into high quality spaghetti with no more than 600 pounds of water, as compared with a normal requirement of 1,020 pounds. Vermicelli, egg noodles, macaroni and like paste products can likewise be satisfactorily processed at similar reductions in the proportion of process water required. Since, as noted hereinafter, emulsifiers are not required or of particular value in the processing of the present invention, there is no need to heat the added water, thus facilitating use of process water at room temperature or lower.

The mixed paste is next extruded in Step 12, either as part of a continuous process or following transfer to the extruder in a batch process. In accordance with the present invention, the extrusion force required in Step 12 can be very substantially reduced due to the effects of the paste modifying agents of the present invention, such reduction being expressed in absolute terms (e.g., pounds per square inch), or, more appropriately, in terms of the work or energy required to effect extrusion (e.g., horse power or amperage to operate press). However, as a practical matter, the most significant advantage of the described decrease in energy requirements is the above noted ability to carry out the mixing and extrusion steps with substantially reduced amounts of process water. Thus, in the extrusion in Step 12, the relatively high extrusion pressures normally encountered in macaroni presses are advantageously employed with substantially reduced amounts of process water. To illustrate, the extrusion presses can be effectively operated at conventional extrusion pressures (viz., 3,500 to 7,000 psi) with paste mixes containing but 60 to 90 percent of the normal requirements for process water.

Following extrusion in Step 13, the freshly extruded lengths of paste are cut or severed in Step 14 to form paste units of desired shape and length. In the macaroni industry, cutting is normally accomplished by running a knife over the surface of the extrusion die, at appropriate intervals, as the dough is extruded. Cutting may be accomplished by manual, automatic, or semi-automatic devices as may be appropriate to the particular operation and the product being produced. In general, the cutting step in the present invention may be carried out in conventional manner and need not be further described.

The extruded, cut macaroni units are next subjected to pre-drying in Step 16. Normally, macaroni products leaving an extrusion die are moist, soft and warm, and tend to stick or clump in undesirable fashion. Adding emulsifiers to the paste mix to prevent this condition has been found to be unnecessary in the process of the present invention, because use of the disclosed paste modifying agents unexpectedly alters and avoids the conditions which lead to stickiness or clumping. Pre-drying is nevertheless useful in the process of the invention, to effect an initial removal of moisture from the extruded, cut product. However, as the extruded products have a substantially reduced moisture content, the pre-drying step can be substantially reduced in duration. Such reduction is particularly effective in avoiding the harsh drying conditions frequently encountered in pre-drying, and which produce a tough, case-hardened skin on the outer surface of the product which leads to subsequent checking and cracking in the final drier. The extent of such reduction in pre-drying times will depend, of course, upon the nature of the processing and the particular product being produced. Thus, in conventional processing to produce spaghetti, the pre-drying period may range from two to three hours, and effect a drying of the extruded product from a moisture content of approximately 30 percent to, say, 20 to 24 percent. However, in our process, as a result of the substantial decrease in the amount of process water added in Step 10, the moisture content of the extruded product will approximate 60 to 90 percent that of the conventional product, or 18 to 27 percent. Therefore, the time in the pre-drying Step 16 may be substantially reduced or, alternatively, the pre-drying step may be entirely eliminated, for example, where fully dried product is not required as in the canning or wet packaging of the product in Step 18. The extruded product may pass directly from the cutting Step 14 to the packaging Step 18. In contrast, where improved product quality may be desired, the pre-drying in Step 16 may be carried out in conventional manner to provide a product which does not require blanching or steaming, to insure desired surface characteristics for the wet packaging operation. For example, we have found that such processing provides a product which is characterized by a reduced tendency toward sloughing of surface materials, which would otherwise cloud and thicken the liquid portion of a canned or prepared food.

In most cases, the pre-dried product from Step 16 will be subjected to final drying in Step 20. While such drying may be carried out in conventional equipment for such purpose (e.g., batch and continuous driers of various types, such as tray, drum and tunnel driers), we have found that the time and amount of drying is very substantially reduced by virtue of the reduced amount of water added in the initial mixing Step 10. Specifically, we have found that drying times in the final drying stages can be reduced as much as 15 to 35 percent. The energy requirements for drying can also be substantially reduced. To illustrate, in a typical process for producing spaghetti, the spaghetti units can be effectively dried to a final moisture content of the order of 13 to 14 percent in a period of 12 to 13 hours, compared to 16 to 20 hours in present processes. We have additionally observed that the product obtained by such drying cycle evidences more uniform drying and a reduced tendency toward surface checking and cracking.

Following final drying in Step 20, as above described, the dried product may be packaged in Step 22 according to conventional commercial practice. In general, the products produced by the present invention exhibit a desired final color and texture, comparatively smoother outer extruder surfaces, a reduced tendency towards warping and surface cracking, and a high degree of tolerance to cooking variations without loss of shape or taste.

As paste modifying agents in the described processing, we employ whey solids in conjunction with sulfhydryl type reducing substances (i.e., compounds containing — SH groups or capable of initiating reactions to reduce the — S-S-Bonds in gluten to form — SH groups). While the described paste modifying agents may be employed individually to achieve the desired results, we prefer to use the whey solids in combination with a relatively smaller quantity of the sulfhydryl reducing substance to achieve a cumulative or synergistic effect in achieving the advantages herein described and claimed. In either event, and whether used in the form of liquid whey or dry whey solids, the proportion of whey solids is used in the range from about 1 to 4 percent on the weight of the semolina. In contrast, the sulfhydryl reducing substance is used in much smaller proportion, ranging from about 0.003 to 0.030 percent on the weight of the semolina. These proportions of the paste modifying agents apply regardless of whether the agents are used individually, or in combination.

Figure 2:
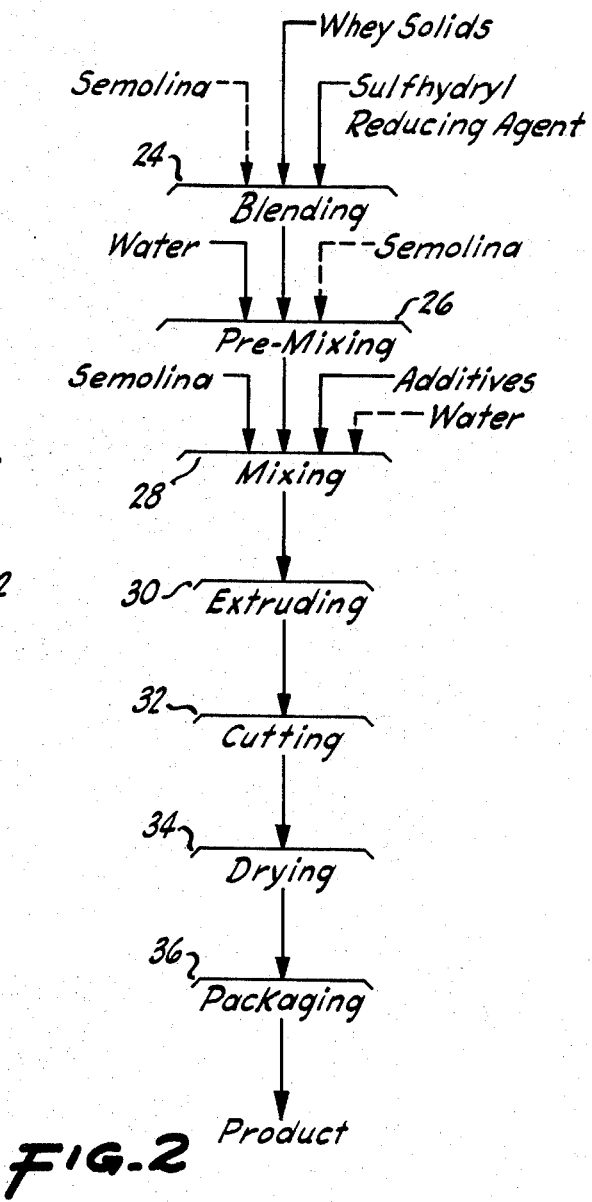
FIG. 2 is a flow sheet illustrating another embodiment of the invention.

Referring to FIG. 2, Step 24 represents one procedure for incorporating the sulfhydryl reducing substance as part of a blend with a much larger proportion of dried whey. For example, to achieve an addition of 40 parts per million (ppm) of the sulfhydryl reducing agent, with each 1 percent addition of whey solids on the semolina, the blend in Step 24 might comprise 0.4 percent of the reducing agent mixed with 99.6 percent dried whey. An addition of 80 ppm of reducing agent would be achieved by adding 2 percent of this blend, and so on. In one satisfactory practice of the invention, the blend of paste modifying agents obtained from Step 24 is added or pre-mixed in Step 26 with the process water. The process water is then mixed with the semolina and other additives, as may be desired, in Step 28. Subsequent processing to extrude, cut, dry and package the macaroni products, in Steps 30, 32, 34 and 36, can be as previously described in FIG. 1 in conjunction with Steps 12, 14, 16, 20 and 22.

It will be appreciated, of course, that the whey solids and sulfhydryl reducing agents may be independently added to the process water, in Step 26, or to the mixing Step 28, without any pre-mixing or blending. Alternatively, the whey solids or the reducing agents may be individually added to the process, for example by pre-mixing with the water in Step 26 or by direct incorporation in the mixing Step 28. As a still further alternative, one or more of the paste modifying agents can be incorporated in a dry mixing step with the semolina, as generally represented by the dotted line addition of the semolina in Step 24. Such dry mixing step might also include other additives such as enrichment, vitamins, and the like. In either case, the pre-mixed ingredients can be added to the water in Step 26, or mixed directly with the water in Step 28 (represented by the dotted line addition in Step 28). In general the specific order of mixing, pre-mixing or blending is not essential to obtaining the advantages of the present invention, and any suitable mixing procedure or order of mixing may be employed as may be necessary or practical in a particular plant operation.

As used herein, the term "whey" generally means the product which remains after the removal of most of the casein and fat from milk in the process of cheese making. Wheys useful in carrying out the present invention are sweet dairy (rennet) wheys derived, for example, from processing to produce cheddar or Swiss cheese. Sweet dairy wheys of the type described are relatively rich in lactalbumin, lactose and mineral matter. The protein in such whey, being rich in the amino acids lysine and tryptophane, serves to supplement the wheat protein and to improve the amino acid balance in the final macaroni products. Sweet dairy whey is also a good source of water soluble vitamins, especially riboflavin, vitamin $B_{12}$ and pantothentic acid. In this regard, one pound of macaroni product from a process employing, say, 2 percent whey on the semolina, would provide 26% RDA of riboflavin. The calcium found in sweet whey is also present at levels sufficient to provide approximately 70 milligrams per pound of macaroni product, at the 2 percent level.

While it is possible to use liquid whey in the process of the present invention, with the liquid portion of the whey replacing part of the process water, we prefer to use dry whey solids. One commercial process for the manufacture of a satisfactory whey powder involves evaporating the raw whey, such as the whey resulting from the manufacture of sweet cheddar or Swiss cheese, to produce a concentrate containing from 30 to 55 percent solids, followed by spray drying. Spray drying as disclosed in U.S. Pat. No. 2,088,606 may be employed to provide a non-hygroscopic powder. In either event, whether used dry or in liquid form, the solids content of the whey may be within the range from about 1 to 4 percent on the weight of the semolina, with an optimum concentration at about 2 percent on the semolina.

As sulfhydryl reducing substances, we employ one or more compounds selected from the group consisting of cysteine glutathione, sulfite salts and mixtures thereof and, specifically, L-cysteine hydrochloride, glutathione and sodium bisulfite. All of these compounds are sulphur-containing or sulfhydryl type reducing agents, which are non-toxic and do not form any toxic or otherwise objectionable by-products with other ingredients in the mix. They have no detrimental effect upon flavor, nutritional value or other essential properties of the final macaroni products. Satisfactory paste modifying agents according to the invention include compounds related to or homologous with L-cysteine hydrochloride such as D and DL cysteine hydrochloride, the free bases of L, D, and DL cysteine, L-cysteine monophosphate, di-L-cysteine sulfate and L-monocysteine tartrate. Homocysteine is likewise related to the foregoing compounds and can be used. Various sulfite salts such as potassium bisulfite and sodium or potassium sulfite can be used in place of sodium bisulfite. Related compounds such as hydrosulfite and pyrosulfite salts may be employed. Natural foods such as an inactive dry yeast, unheated soy flour, etc., may also be used as sources of cysteine and/or glutathione.

The physical properties imparted to the mixed paste by the foregoing paste modifying agents, as well as the chemistry involved in obtaining the described results by use of such paste modifying agents, are not clearly understood. However, as respects the solids content of the whey, the lactose content is believed to have properties which assist in the drying function whereas the whey proteins are known to include sulfhydryl groups (— SH groups) which are capable of modifying the gluten content of the semolina and improving the amino acid balance. The reducing agents disclosed herein also contain sulfhydryl groups, or are capable of producing sulfhydryl groups in gluten by the reduction of the sulphur present in — S-S-Bonds in the gluten to —SH groups. In a blend or combination of the disclosed paste modifying agents viz., whey/cysteine), the whey proteins function to reinforce and help stabilize the cysteine from the point of view of oxidation/reduction poising. Thus, both individually and in combination, the paste modifying agents serve to create conditions which supplement the mixing stresses in rupturing and reducing the — S-S-Bonds and in permitting the sulfhydryl groups to attach on one end. Such conditions tend to prevent re-establishment of the cross linking and to produce an increased extensibility within the gluten which apparently effects a substantial reduction in the energy required in the present process, for mixing and extrusion.

As respects the drying function, the improvements attributable to the paste modifying agents are likewise not clearly understood. However, it is believed that the lactose in whey transforms into micro-crystalline lactose during the drying, so that an appreciable portion of the moisture content of the paste is present in the form of bound moisture in lactose hydrate. As the drying subsequently passes through critical moisture levels, the micro-crystalline structures tend to break up the films that would otherwise be caused by surface drying, thereby keeping microscopic channels open for the movement of water vapor as the drying progresses. The described drying function may also prevent the creation of forces in surface areas of the macaroni products which normally lead to checking and cracking. As respects the sulfhydryl reducing agents, a certain tendency towards skin formation on the extruded products has been observed which (in conjunction with extruded products of reduced moisture content as herein produced) aids in shortening the period of preliminary drying. These drying functions combine with those of the whey (which functions as a relatively non-absorbing solid in the extruded mix), so that the effects of the whey and sulfhydryl reducing agents become cumulative, if not synergistic, in effect. In this regard, other apparently equivalent compounds (e.g., non-fat milk solids in place of the whey), fail to produce equivalent results as respects the improved mixing and extrusion characteristics and the reduction in process water requirements.

The features and the advantages of the process of the present invention are further demonstrated by the following examples, in which all concentrations of ingredients are expressed as a per cent of the flour (i.e., semolina).

EXAMPLE 1 – REDUCED ENERGY FOR MIXING

Paste Formula

|  | Regular | Whey | Cysteine | Whey Cysteine |
|---|---|---|---|---|
| Durum Semolina (Moisture Content - 14%) | 50.0 | 48.5 | 48.5 | 48.5 |
| Water | 18.0 | 18.0 | 18.0 | 18.0 |
| Whey |  | 1.8 |  | 1.8 |
| L-cysteine HCl |  |  | 0.012 | 0.0075 |

PROCEDURE

1. Place durum semolina in bowl of standard 50 gram Brabender farinograph.
2. Add 18 ml of water, together with other ingredients.
3. Mix to peak dough consistency.

Results

|  | Regular | Whey | Cysteine | Whey/Cysteine |
|---|---|---|---|---|
| Mix Time, min. | 3 | 3 | 3 | 3 |
| Peak Consistency (B.U.) | 635 | 470 | 540 | 450 |

The foregoing results show that the time required to reach the point of a maximum dough consistency is the same for each of the mixes. However, the Brabender Units (B.U.) at the point of peak consistency (which is a measure of the required mixing energy) is substantially reduced by the addition of the paste modifying agents, with the greatest reduction being achieved by the whey/cysteine blend.

EXAMPLE 2 — REDUCED ENERGY FOR EXTRUSION

PASTE FORMULA

Using the procedure of Example 1, macaroni doughs were prepared according to the regular and whey/cysteine formulations, except that water was added in varying amounts of 12, 13, 14, 15 and 16.5 mls. to provided added water in portions representing 24, 26, 28, 30 and 33 percent additions, respectively, on the weight of the semolina.

PROCEDURE

In each case, the paste formula was mixed for 1½ minutes in the bowl of a standard Brabender farinograph following which 25 grams of the dough were extruded through a four-hole circular macaroni die of 1.9 square inch surface area. The dough was extruded and the extrusion force measured in pounds per square inch.

Results

| Added Water, % | Extrusion Force, psi | |
|---|---|---|
|  | Regular | Whey/Cysteine |
| 24 | 870 | 400 |
| 26 | 350 | 250 |
| 28 | 290 | 160 |
| 30 | 202 | 105 |
| 33 | 94 | 78 |

The foregoing results show that the addition of 1.8 percent whey and 0.0075 percent L-cysteine HCL substantially reduces the pressure required for extrusion at equivalent amounts of added water, such reduction ranging up to 45 percent at 28–30 percent added water. The results further show that substantially reduced amounts of water are required at equivalent extrusion pressures, a whey/cysteine mix with 26 percent added water being extrudable at substantially the same extrusion pressure as a regular mix containing between 28 and 30 percent added water.

EXAMPLE 3 – REDUCED ENERGY FOR EXTRUSION

FORMULA AND PROCEDURE

Macaroni dough mixes were prepared according to the procedure of Example 1, to provide a control and mixes containing 50 and 300 parts per million L-crysteine HCl respectively. The extrusion pressure required for each mix was determined in the Instron Universal testing machine, according to the procedure of Example 2.

Results

| Mix | L-cysteine HCl % | Extrusion Force, psi |
|---|---|---|
| Regular | 0.0 | 290 |
| Modified | 0.005 | 210 |
| Modified | 0.030 | 170 |

As indicated, the addition of 50 ppm L-cysteine HCl reduces the extrusion force by approximately 28 percent, while the addition of 300 ppm of L-cysteine HCl reduces the extrusion force in excess of 40 percent.

EXAMPLE 4 – REDUCED WATER REQUIREMENT

Paste Formula

|  | Regular | | | Whey/Cystein | | |
|---|---|---|---|---|---|---|
|  | (1) | (2) | (3) | (4) | (5) | (6) |
| Durum Semolina (Moisture Content, 14%) | 100.0 | 100.0 | 100.0 | 100.0 | 100.0 | 100.0 |
| Water | 13.0 | 14.0 | 17.2 | 13.0 | 14.0 | 17.2 |
| Whey/Cysteine Blend* |  |  |  | 4.0 | 4.0 | 4.0 |

*99.6% Spray dried whey blended with 0.4% L-cysteine HCl

PROCEDURE

1. The mixing chamber of a laboratory size (25 lb/hr) Demaco macaroni press was filled with 100 parts of durum semolina.

2. Water was added in the varying proportions indicated in runs (1), (2) and (3), and in the same proportions with 4 parts of the whey/cysteine blend in runs (4), (5) and (6).

3. Mixing was accomplished on a batch basis to a proper consistency for extrusion, and the extrusion pressures measured in terms of the amperage required to operate the press.

4. The extruded macaroni was dried overnight on sticks, and the quality of the products observed.

Results

| Added Water, % | Extrusion Pressure, Amps | |
|---|---|---|
|  | Regular | Whey/Cysteine |
| 13.0 | 10+ | 5.7 |
| 14.0 | 8.0 | 4.8 |
| 17.2 | 4.5 | 3.8 |

The above results show that the addition of the whey/cysteine paste modifying agent effected substantial reductions in the energy required for extrusion, at each of the levels of water addition. Thus, the reduction at 13 percent added water was approximately 33 percent whereas the reduction at 14 percent added water was 40 percent. The results also show that the amount of water necessary to effect satisfactory extrusion is significantly reduced by the addition of the whey/cysteine blend. For example, the extrusion energy required at a 14 percent water addition, with whey/cysteine, is approximately equal to the extrusion energy required at a 17.2 percent water addition, with the regular mix. The dried products also exhibited improved characteristics in that the extruded surface of the products made with the whey/cysteine blend was smoother than the regular product and exhibited less checking and cracking than the regular product.

Example 5 – PRODUCTION SIZE RUN

Formula

| Ingredient | Pounds | Per Cent |
|---|---|---|
| Durum Semolina | 3000.0 | 100.0 |
| Water | 600.0 | 20.0 |
| Whey/Cysteine Blend* | 60.0 | 2.0 |

*99.6% spray dried whey blended with 0.4% L-cysteine HCl

Procedure

The whey/cysteine blend was dispersed in the water, at room temperature. The resulting 10 percent whey/cysteine dispersion was mixed on a continuous basis with the durum semolina in a large scale (1,500 lb/hr.) Demaco macaroni press. Mixing and extruding were accomplished in conventional manner until the ingredients were consumed, the mix entering the press in the form of a crumbly dough which easily extruded onto the rods of the continuous pre-drier. Following a 2½ hour pre-drying cycle, the product (spaghetti) was transferred to racks for final drying in a stationary floor dryer. Drying to a final moisture content of 13–14 percent was completed in about 12½ hours, or within a total drying period of about 15 hours.

RESULTS

Mixing and extruding was easily accomplished, and produced a product having an unusually smooth outer surface. The proportion of process water (600 lbs.) was about 60 percent of normal requirements (e.g., about 1,000 lbs.). The total drying period was consequently greatly reduced over the normal drying cycle (15 hours, as compared to about 19 hours), representing a decrease in drying energy and time in excess of 20 percent. The final, dried product exhibited properties associated with a uniformly dried product and, upon subsequent storage, exhibited no evidence of checking or cracking.

To those skilled in the art to which this invention relates, many different applications and embodiments of the invention will suggest themselves without departing from the spirit and scope of the invention. In general, however, we have determined that the process disclosed herein can be satisfactorily employed in producing most of any type of macaroni product. Thus, it may be satisfactorily used in the processing of various types of extruded macaroni products such as vermicelli, spaghetti, noodles (e.g., plain and egg varieties) macaroni (elbows, wheels, rings, etc.), various specialty products (e.g., screw-shaped noodles, stars and melon seed for soups), rice macaroni, seasoned macaroni and, in fact, virtually all types of macaroni or alimentary paste products. The process of the present invention also provides advantages in the processing of macaroni products where no extrusion is required, such as rolled and cut macaroni, due to the greater ease of handling and the improvements in the drying characteristics. Other variations, such as the use of milk (whole or skim) to replace all or part of the process water or the use of various wheat, soy or farina flours, to replace part of the durum flour, are likewise clearly within the scope of the present invention. It will be appreciated that it is not feasible to illustrate all possible variations by specific example, and the disclosures and description herein should consequently be considered as purely illustrative and not in any sense limiting.

We claim:

1. A process for the manufacture of macaroni and like alimentary pastes, comprising the steps of mixing essential paste forming ingredients including semolina and water with a paste modifying agent consisting of whey in an amount within the range from about 1 to 4 percent on the weight of the semolina together with L-cysteine hydrochloride in an amount within the range from about 0.003 to 0.30 percent on the weight of the semolina, the mixing of the paste modifying agent with the semolina and water serving to reduce the amount of added water required to effect mixing and extrusion while imparting improved mixing, extrusion and drying characteristics to the mixed paste, extruding the resulting mixed paste, and cutting lengths of extruded paste to form units of desired shape and length.

2. A process for the manufacture of macaroni and like alimentary pastes, comprising the steps of mixing essential paste forming ingredients including semolina and water with a paste modifying agent consisting of dried whey in an amount within the range from about 1 percent to about 4 percent on the weight of the semolina, the mixing of the paste modifying agent with the semolina and water serving to reduce the amount of added water required to effect mixing and extrusion while imparting improved mixing, extrusion and drying characteristics to the mixed paste, extruding the resulting mixed paste, and cutting lengths of extruded paste to form units of desired shape and length.

3. A process for the manufacture of macaroni and like alimentary pastes, comprising the steps of mixing essential paste forming ingredients including semolina and water with a paste modifying agent consisting of liquid whey, said liquid whey having a solids content within the range from about 1 percent to about 4 percent on the weight of said semolina, the mixing of the paste modifying agent with the semolina and water serving to reduce the amount of added water required to effect mixing and extrusion while imparting improved mixing, extrusion and drying characteristics to the mixed paste, extruding the resulting mixed paste, and cutting lengths of extruded paste to form units of desired shape and length.

4. A process for the manufacture of macaroni and like alimentary pastes, comprising the steps of mixing essential paste forming ingredients including semolina and water with a paste modifying agent consisting of glutathione in an amount within the range from about 0.003 to about 0.030 percent on the weight of the semolina, the mixing of the paste modifying agent with the semolina and water serving to reduce the amount of added water required to effect mixing and extrusion while imparting improved mixing, extrusion and drying characteristics to the mixed paste, extruding the resulting mixed paste, and cutting lengths of extruded paste to form units of desired shape and length.

5. A process for manufacture of macaroni and like alimentary pastes, comprising the steps of mixing essential paste forming ingredients including semolina and water with a paste modifying agent consisting of sodium bisulfite in an amount within the range from about 0.003 to 0.030 percent on the weight of the semolina, the mixing of the paste modifying agent with the semolina and water serving to reduce the amount of added water required to effect mixing and extrusion while imparting improved mixing, extrusion and drying characteristics to the mixed paste, extruding the resulting mixed paste, and cutting lengths of extruded paste to form units of desired shape and length.

6. A process for the manufacture of macaroni and like alimentary pastes, comprising the steps of mixing essential paste forming ingredients including semolina and water with a paste modifying agent consisting of a small amount of whey and a relatively smaller amount of an edible sulfhydryl reducing substance selected from the group consisting of cysteine, glutathione, sulfite salts and mixtures thereof, said paste modifying agent being in an amount sufficient to reduce the amount of added water required to effect the mixing and to provide a mixed paste with enhanced extrusion characteristics, extruding the resulting mixed paste to provide extruded lengths of paste characterized by a relatively non-glutinous surface having reduced tendency towards stickiness and clumping, cutting lengths of such extruded paste to form units of desired shape and length, and immediately packaging the extruded lengths while still wet without any intermediate drying.

7. A process for making macaroni and like alimentary pastes, comprising the steps of mixing essential paste forming ingredients including semolina and water with a paste modifying agent comprising in a major proportion whey solids and in minor proportion a sulfhydryl reducing substance selected from the group consisting of cysteine, glutathione, sulfite salts, and mixtures thereof, said paste modifying agent being in an amount sufficient to reduce the amount of added water required to effect mixing and extrusion of the paste, and extruding and cutting the resulting mixed paste to form units of desired shape and length.

8. A process as in claim 7 wherein the whey solids are present in an amount within the range from about 1 to 4 percent on the weight of the semolina.

9. A process as in claim 7 wherein the sulfhydryl reducing substance is present in an amount within the range from about 0.003 to 0.30 percent on the weight of the semolina.

10. A process as in claim 7 wherein the whey solids and sulfhydryl reducing substance are premixed prior to mixing with the water and semolina.

11. A process as in claim 10 wherein the premixed whey solids and sulfhydryl reducing substance are added to the water prior to mixing with the semolina.

12. A process as in claim 10 wherein the whey solids and sulfhydryl reducing substance are dry mixed with the semolina, prior to mixing with the water.

13. A process as in claim 7 wherein the whey solids are added to the water prior to the mixing.

14. A process as in claim 7 wherein the whey solids are premixed with the semolina, prior to the mixing.

15. A process as in claim 7 wherein the sulfhydryl reducing substance is added to the water prior to the mixing.

16. A process as in claim 7 wherein the sulfhydryl reducing substance is premixed with the semolina prior to the mixing.

* * * * *